(12) United States Patent
Zhang et al.

(10) Patent No.: US 12,485,377 B2
(45) Date of Patent: Dec. 2, 2025

(54) AIR FILTER CLEANING DEVICE AND MEDICAL IMAGING SYSTEM

(71) Applicant: GE Precision Healthcare LLC, Wauwatosa, WI (US)

(72) Inventors: Ying Zhang, Wuxi (CN); Yalan Yang, Wuxi (CN); Jie Wang, Wuxi (CN); Hongyu Zhao, Wuxi (CN)

(73) Assignee: GE Precision Healthcare LLC, Waukesha, WI (US)

( * ) Notice: Subject to any disclaimer, the term of this patent is extended or adjusted under 35 U.S.C. 154(b) by 406 days.

(21) Appl. No.: 18/069,773

(22) Filed: Dec. 21, 2022

(65) Prior Publication Data

US 2023/0211274 A1    Jul. 6, 2023

(30) Foreign Application Priority Data

Dec. 31, 2021 (CN) .......................... 202111670797.2

(51) Int. Cl.
*B01D 46/00* (2022.01)
*B01D 46/68* (2022.01)
*B01D 46/681* (2022.01)

(52) U.S. Cl.
CPC ............ *B01D 46/68* (2022.01); *B01D 46/681* (2022.01); *B01D 2279/45* (2013.01)

(58) Field of Classification Search
CPC .. B01D 46/68; B01D 46/681; B01D 2279/45; B01D 46/44; B01D 46/48; A61B 8/44; A61B 8/4422

USPC ......................................................... 55/490
See application file for complete search history.

(56) References Cited

U.S. PATENT DOCUMENTS

| | | | | |
|---|---|---|---|---|
| 3,487,623 A | * | 1/1970 | Easter | B01D 46/10 74/25 |
| 6,041,612 A | * | 3/2000 | Stringer | F28G 1/02 165/95 |
| 8,974,564 B2 | * | 3/2015 | Hershbarger | A01D 41/1252 55/296 |
| 2015/0320389 A1 | * | 11/2015 | Miyagi | A61B 8/4427 600/459 |

FOREIGN PATENT DOCUMENTS

CN            111884056 A  * 11/2020  .......... B01D 46/681

* cited by examiner

*Primary Examiner* — T. Bennett McKenzie
(74) *Attorney, Agent, or Firm* — SPQ IP LLC

(57) ABSTRACT

A cleaning device of an air filter of a medical imaging system includes: a linkage assembly; a filter cleaning assembly, mounted on the linkage assembly; and a driving assembly, connected to the linkage assembly and used, in response to a received control signal, to drive the linkage assembly to move so as to drive the filter cleaning assembly to move relative to the air filter to clean the air filter, a motion path of each point on an extension shaft of the filter cleaning assembly forming at least a portion of a circle or at least a portion of a plurality of repeating circles, and the central axis extending in a first extension direction at any time in the motion. A medical imaging system and a method of using the cleaning device are also disclosed.

17 Claims, 12 Drawing Sheets

AIR FILTER CLEANING DEVICE AND MEDICAL IMAGING SYSTEM

CROSS-REFERENCE TO RELATED APPLICATION

This application claims priority to Chinese patent application number 202111670797.2, filed on Dec. 31, 2021, the entirety of which is incorporated herein by reference.

FIELD OF THE INVENTION

Embodiments of the present invention relate to medical imaging technology, and more specifically to a medical imaging system and a device and method for cleaning an air filter of a medical imaging system.

BACKGROUND OF THE INVENTION

A medical imaging system may include an electronic device housed therein and a cooling mechanism for preventing the electronic device from overheating. In some medical imaging systems using flowing gas to perform cooling, such as an ultrasonic apparatus, a filter may be included, and is used to filter cooling gas entering the medical imaging systems. The cooling gas may be air in an external environment. Filtered air is discharged out of the medical imaging system after passing by the electronic device, so as to take heat away. The aforementioned filter of the medical imaging system needs to be replaced or cleaned regularly. Replacement or cleaning of the filter is typically performed manually. If the filter is not cleaned or replaced in time, flowing of air may be affected because too much dust is deposited on the filter, causing the electronic device to overheat, thereby resulting in deteriorated system performance or even a system failure. However, overly frequent replacement or cleaning may result in waste of manpower.

BRIEF DESCRIPTION OF THE INVENTION

In an aspect of the present invention, provided is a cleaning device of an air filter of a medical imaging system, comprising: a linkage assembly; a filter cleaning assembly, mounted on the linkage assembly; and a driving assembly, connected to the linkage assembly and used, in response to a received control signal, to drive the linkage assembly to move so as to drive the filter cleaning assembly to move relative to the air filter to clean the air filter, a motion path of each point on an extension shaft of the filter cleaning assembly forming at least a portion of a circle or at least a portion of a plurality of repeating circles, and the extension shaft extending in a first extension direction at any time in the motion.

In another aspect of the present invention, also provided is a cleaning device of an air filter of a medical imaging system, comprising: a linkage assembly, comprising a first crank, a second crank, and a mounting frame, the first crank and the second crank having respective extension shafts parallel to each other, the first crank, the second crank, and the mounting frame each comprising a first end and a second end, and the first end and the second end of the mounting frame being respectively hinge-connected to the second end of the first crank and the second end of the second crank; a filter cleaning assembly, mounted on the mounting frame; and a driving assembly, connected to at least one of the first crank and the second crank, the driving assembly being used, in response to a received control signal, to drive the first crank and the second crank of the linkage assembly to rotate about the respective first ends thereof, and drive the filter cleaning assembly to move relative to the air filter to clean the air filter.

It should be understood that the brief description above is provided to introduce, in simplified form, some concepts that will be further described in the detailed description. The brief description above is not meant to identify key or essential features of the claimed subject matter. The scope is defined uniquely by the claims that follow the detailed description. Furthermore, the claimed subject matter is not limited to implementations that solve any disadvantages noted above or in any section of the present disclosure.

BRIEF DESCRIPTION OF THE DRAWINGS

The present invention will be better understood by reading the following description of non-limiting embodiments with reference to the accompanying drawings, where.

DETAILED DESCRIPTION OF THE INVENTION

Specific implementations of the present invention will be described below. It should be noted that in the specific description of these embodiments, for the sake of brevity and conciseness, this specification may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Furthermore, it should also be understood that although efforts made in such development processes may be complex and tedious, for those of ordinary skill in the art related to the content disclosed in the present invention, some design, manufacture, or production changes based on the technical content disclosed in the present disclosure are only common technical means, and should not be construed as insufficient content of the present disclosure.

Unless defined otherwise, technical terms or scientific terms used in the claims and specification should have usual meanings understood by those of ordinary skill in the technical field to which the present invention belongs. The terms "first," "second," and similar terms used in the description and claims of the patent application of the present invention do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections.

Figure 1:
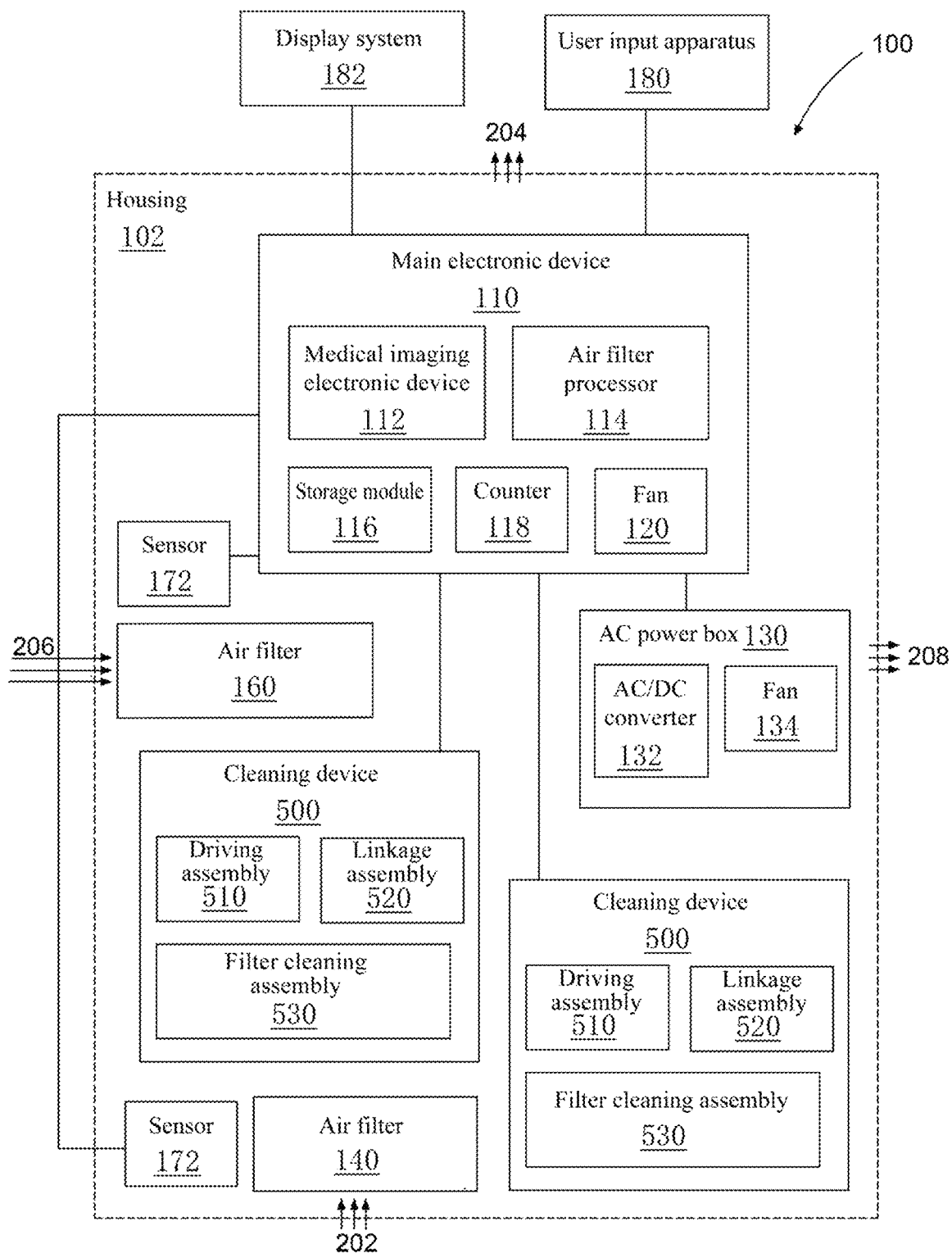
FIG. 1 is a block diagram of a medical imaging system 100 according to various embodiments of the present invention.
Figure 2:
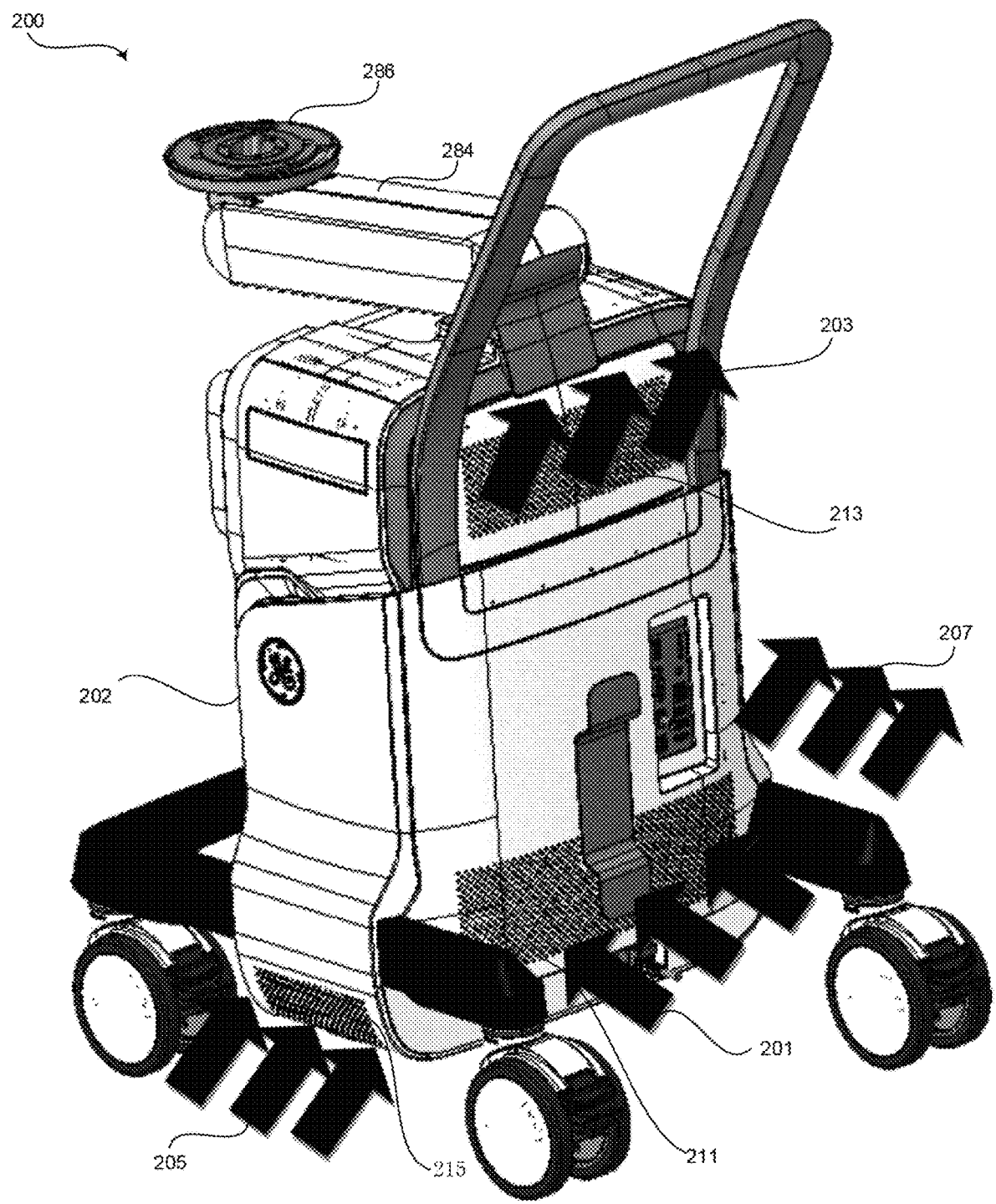
FIG. 2 shows a schematic structural diagram of an exemplary ultrasonic system 200 according to various embodiments.
Figure 3:
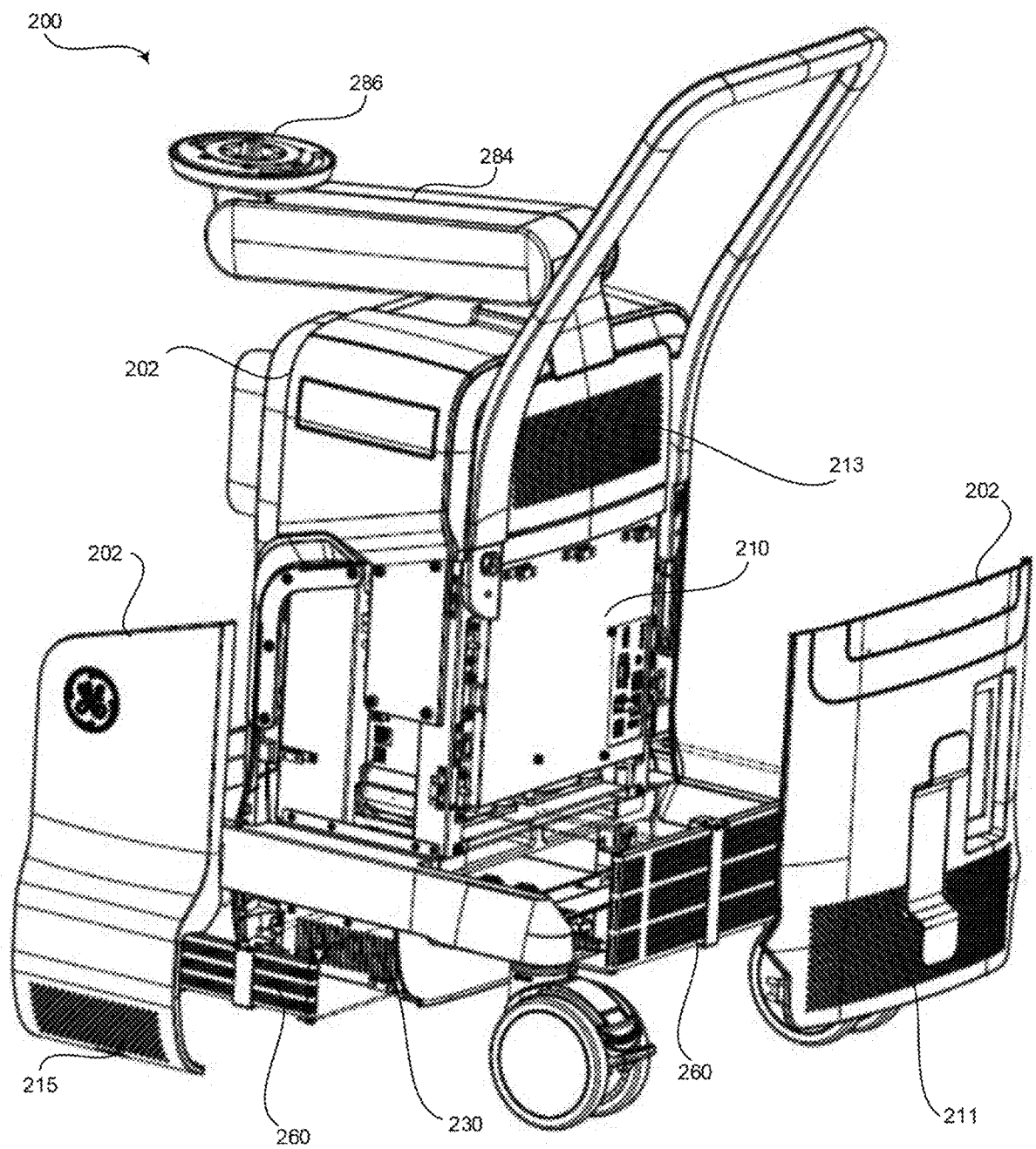
FIG. 3 is an exploded view of the exemplary ultrasonic system 100 of FIG. 2 according to various embodiments.
Figure 4:
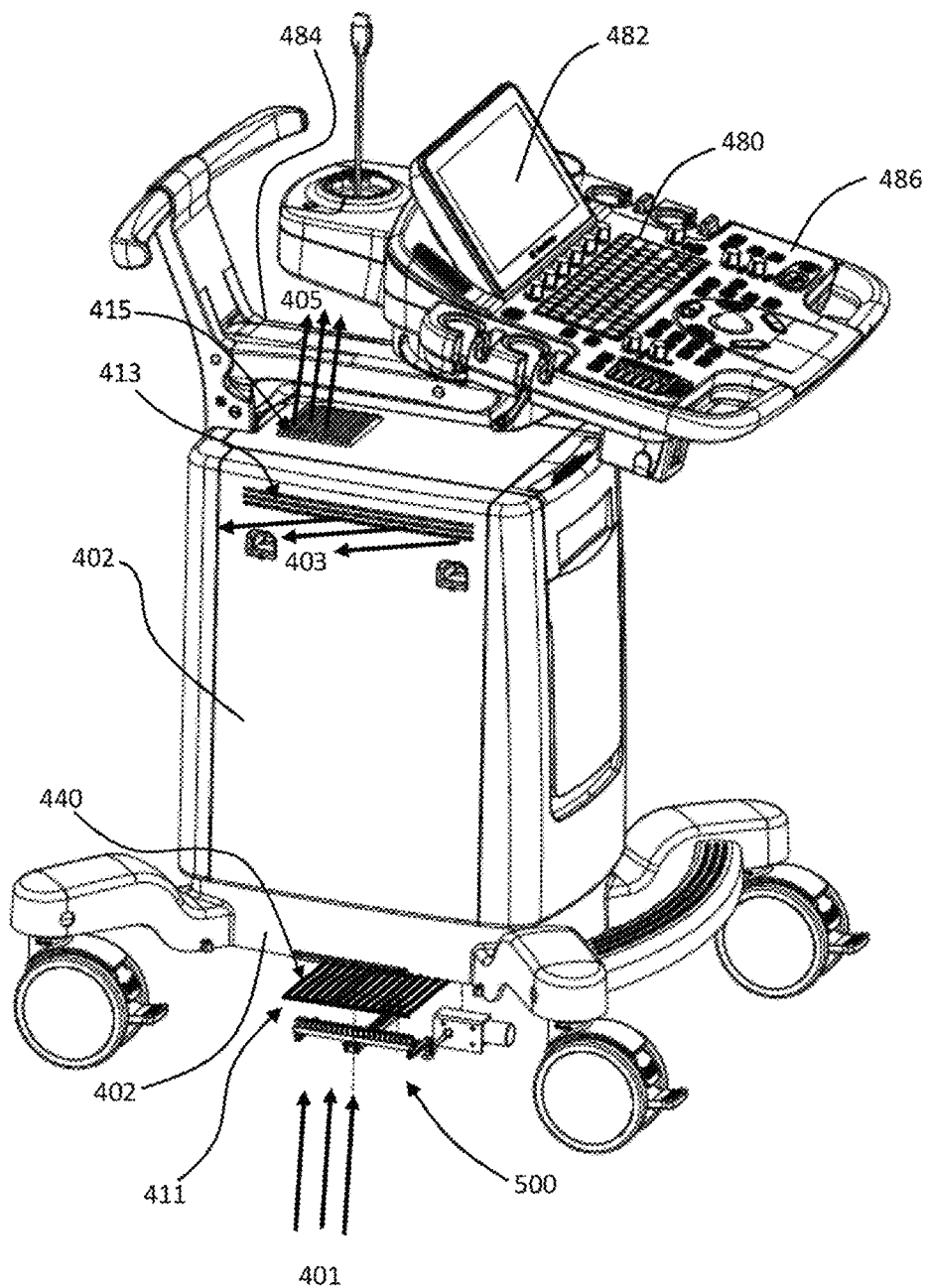
FIG. 4 shows an exploded view of another exemplary ultrasonic system 400 according to various embodiments.

FIG. 1 is a block diagram of a medical imaging system 100 according to various embodiments of the present invention. The medical imaging system 100 has one or more air filters, and can be operated to automatically clean the air filter. FIG. 2, FIG. 3, and FIG. 4 show an exemplary ultrasonic imaging system. However, it should be noted that the various aspects of the present invention are not limited to ultrasonic imaging systems, and are applicable to any medical imaging system having an air filter.

Referring to FIG. 1, the medical imaging system 100 includes a main electronic device 110, an AC power box 130, an air filter 140, and an air flow characteristic sensor that are provided in a housing 102. The medical imaging system 100 further includes a user input apparatus 180 and a display system 182 communicatively coupled to the main electronic device 110.

The user input apparatus 180 may be used to input patient data, a medical imaging parameter, and a setting, and select a protocol and/or template, etc. In an exemplary embodiment, the user input apparatus 180 is operable to configure, manage, and/or control operation of one or more components and/or modules in the medical imaging system 100. In this regard, the user input apparatus 180 is operable to configure, manage, and/or control operation of a medical imaging electronic device 112, an air filter processor 114, a storage module 116, the user input apparatus 180, and/or the display system 182. The user input apparatus 180 may include a touch panel, a button, a rotary encoder, a motion tracking apparatus, a voice recognition apparatus, a mouse apparatus, a keyboard, a camera, and/or any other apparatus capable of receiving a user instruction. In some embodiments, for example, one or a plurality of the user input apparatuses 180 may be integrated into other components, such as the display system 182. For example, the user input apparatus 180 may include a touch screen display.

The display system 182 may be any apparatus capable of transmitting visual information to a user. For example, the display system 182 may include a liquid crystal display, a light emitting diode display, and/or any one or a plurality of suitable displays. The display system 182 is operable to display information from the medical imaging electronic device 112, the air filter processor 114, and/or the storage module 116, such as an air filter cleaning setting, medical image data, and/or any suitable information.

The main electronic device 110 includes the medical imaging electronic device 112, the air filter processor 114, the storage module 116, a counter 118, and a fan 120. The fan 120 may be configured to prevent overheating of the main electronic device 110 by using the following method: causing ambient-temperature air 101 to be drawn into the housing 102 via the air filter 140 and flow by the main electronic device 110. Heat generated by the main electronic device 110 is transferred to the ambient-temperature air 101 drawn into the housing 102 of the medical imaging system. Then, warm air 103 is discharged from the housing 102.

The AC power box 130 may include an AC/DC converter 132 and a fan 134. The fan 134 may be configured to prevent overheating of the AC power box 130 by using the following method: causing the ambient-temperature air 101 to be drawn into the housing 102 via the air filter 140 and flow by the AC power box 130. Heat generated by the AC power box 130 is transferred to the ambient-temperature air drawn into the housing 102 of the medical imaging system. Then, warm air 107 is discharged from the housing 102.

On the basis of the above description, the ambient-temperature air may, under the action of the fans 120 and 134, sequentially or respectively flow by the main electronic device 110 and the AC power box 130 after being filtered by the same air filter (e.g., the air filter 140). However, the AC medical imaging system 100 may include a plurality of air filters to respectively filter the ambient-temperature air entering the housing from a plurality of different positions. For example, an air filter 160 may also be included, and the fan 134 may be configured to prevent overheating of the AC power box 130 by using the following method: causing ambient-temperature air 105 to be drawn into the housing 102 via the air filter 160 and flow by the AC power box 130. Heat generated by the AC power box 130 is transferred to the ambient-temperature air drawn into the housing 102 of the medical imaging system. Then, the warm air 107 is discharged from the housing 102.

The medical imaging electronic device 112 may be configured to control acquisition of medical image data by means of a probe, a scanner, or the like (not shown), receive the medical image data from the probe, the scanner, or the like (not shown), and perform one or more processing operations according to a modality corresponding to the received medical image data. The medical imaging electronic device 112 may include logic, a circuit, an interface, and/or code that is suitable, and the logic, circuit, interface, and/or code is operable to process the medical image data so as to generate a medical image to be presented on the display system 182. In an exemplary embodiment, the medical imaging electronic device 112 is operable to perform display processing and/or control processing, etc. When medical image data is received, the acquired medical image data may be processed in real time during medical imaging examination. Additionally or alternatively, the medical image data may be temporarily stored during medical imaging examination, and is operated in an online or off-line manner to perform image processing. In various embodiments, the processed medical image data may be presented at the display system 182, and/or may be stored in the storage module 116. The storage module 116 may be a local memory, a picture archiving and communication system (PACS), or any suitable apparatus used to store medical images and related information. The medical imaging electronic device 112 may include one or more central processing units, microprocessors, microcontrollers, etc. For example, the medical imaging electronic device 112 may be an integrated component, or may be distributed over various locations. In an exemplary embodiment, the medical imaging electronic device 112 may receive input information from the user input apparatus 180 and/or the storage module 116, generate an output that can be displayed by the display system 182, and manipulate output, etc., in response to input information from the user input apparatus 180.

The air filter processor 114 may include logic, a circuit, an interface, and/or code that is suitable, and the logic, circuit, interface, and/or code is operable to provide a control signal to the air filter 140 and/or the air filter 160, so as to start automated cleaning of the air filter 140 and/or the air filter 160. The air filter processor 114 may be configured to provide a control signal when the air filter processor 114 determines that a monitored air filter operating condition is no longer within a predetermined threshold. The monitored air filter operating condition may include an amount of time that the medical imaging system 100 has been energized. Additionally and/or alternatively, the monitored air filter operating condition may include an air flow characteristic measured by the air filter sensor. For example, the air filter sensor may include a sensor 152 that measures an air flow characteristic for the air filter 140 and/or a sensor 172 that is used to measure an air flow characteristic for the air filter 160. The air flow characteristic may include a flow rate of air measured by a mass flow rate sensor, a pressure drop of the air filter measured a differential pressure transducer, or any suitable air flow characteristic measured by any suitable sensor, meter, valve, etc. The air filter processor 114 may be configured to, in response to determining that at least one monitored air filter operating condition is not within a predetermined threshold, generate a control signal to be sent to the cleaning device of the appropriate air filter. The control signal provided by the air filter processor 114 may start the corresponding cleaning device to start automated cleaning, as described below with reference to a cleaning device 500.

The air filter processor 114 may be one or more central processing units, microprocessors, microcontrollers, etc. For example, the air filter processor 114 may be an integrated component, or may be distributed over various locations. In an exemplary embodiment, the air filter processor 114 may receive input information from the user input apparatus 180 and/or the storage module 116, monitor the air filter operating condition, and provide a control signal to the air filter to start automated cleaning of the air filter, etc. For example, the air filter processor 114 may perform any one of the methods and/or instruction sets discussed herein according to various embodiments.

The air filter processor 114 may include logic, a circuit, an interface, and/or code that is suitable, and the logic, circuit, interface, and/or code is operable to monitor the amount of energized time or the number of times of start-up of the medical imaging system 100 tracked by the counter 118, so as to determine when to provide the control signal to the air filter 140 and/or the air filter 160 to start automated cleaning of the air filters 140, 160. For example, the main electronic device 110 may include the counter 118. The counter 118 includes logic, a circuit, an interface, and/or code that is suitable, and the logic, circuit, interface, and/or code is operable to track the amount of time that the medical imaging system 100 has been energized. The counter 118 may be configured to increment continuously when the medical imaging system 100 is energized, until the medical imaging system 100 is powered off. The counter 118 may be configured to resume to increment when the medical imaging system 100 is energized again. In various embodiments, the air filter processor 114 may monitor the counter 118 continuously or periodically, so as to determine when a current energized time or the number of times of start-up of the medical imaging system 100 exceeds a predetermined threshold. The predetermined threshold may be set by a manufacturer, a vendor, a user, etc. For example, the predetermined threshold may be 7 days, 30 days, 60 days, or any suitable amount of time, and the predetermined threshold may be 7, 30, 60, or any suitable number of times of start-up. In various embodiments, for each air filter 140, 160 in the medical imaging system 100, the predetermined threshold may be the same or different. The air filter processor 114 may be configured to provide a control signal to the appropriate air filters 140, 160 on the basis of the predetermined threshold associated with the respective air filters 140, 160. The air filter processor 114 may be configured to reset the counter 118 when the predetermined threshold has been exceeded and the control signal is sent to the air filter 140, 160.

The air filter processor 114 may include logic, a circuit, an interface, and/or code that is suitable, and the logic, circuit, interface, and/or code is operable to monitor the air flow characteristic provided by the sensors 152, 172, so as to determine when to provide the control signal to the air filter 140 and/or the air filter 160 to start automated cleaning of the air filters 140, 160. In various embodiments, the air filter processor 114 may continuously or periodically monitor the air flow characteristic provided by the sensor 152 and/or the sensor 172, so as to determine when the air flow characteristic of one or a plurality of air filters in the air filters 140, 160 of the medical imaging system 100 is outside the predetermined threshold. The predetermined threshold may be set by a manufacturer, a vendor, a user, etc. For example, the predetermined threshold may be a minimum mass flow rate, a maximum pressure drop, or any suitable value of the air flow characteristic. In various embodiments, for each air filter 140, 160 in the medical imaging system 100, the predetermined threshold may be the same or different. The air filter processor 114 may be configured to provide a control signal to the air filters 140, 160 on the basis that the air flow characteristic of the appropriate air filters 140, 160 falls outside the predetermined threshold associated with the appropriate air filters 140, 160.

The storage module 116 may be one or more computer readable memories integrated to the medical imaging system 100 and/or communicatively coupled to the medical imaging system 100 (for example, by means of a network), such as a picture archiving and communication system (PACS), a server, a hard disk, a floppy disk, a CD, a CD-ROM, a DVD, a compact memory, a flash memory, a random access memory, a read-only memory, an electrically erasable and programmable read-only memory, and/or any suitable memory. For example, the storage module 116 may include a database, a library, an information set, or another memory that is accessed by and/or combined with the medical imaging electronic device 112 and/or the air filter processor 114. For example, the storage module 116 can temporarily or permanently store data. The storage module 116 can store medical image data, data generated by the medical imaging electronic device 112 and/or the air filter processor 114, and/or instructions readable by the medical imaging electronic device 112 and/or the air filter processor 114, etc. For example, in various embodiments, the storage module 116 stores instructions to be executed by the air filter processor 114, so as to monitor the counter 118 and/or the sensors 152, 172, thereby generating a control signal for automatically cleaning the air filters 140, 160.

The AC/DC converter 132 may include logic, a circuit, an interface, and/or code that is suitable, and the logic, circuit, interface, and/or code is operable to convert an alternating current (AC) from an external power source (not shown) to a direct current (DC), so as to power components of the medical imaging system 100, such as the main electronic device 110, the fans 120, 134, the sensors 152, 172, the air filters 140, 160, the user input apparatus 180, and/or the display system 182.

The medical imaging system 100 may include one or more air filters 140, 160 configured to filter air 202, 206 drawn into the housing 102 of the medical imaging system 100, so as to cool the components of the medical imaging system 100, such as the main electronic device 110 and the AC power box 130. For example, the one or more air filters 140 may include a main body air filter 140 used to filter air passing by the main electronic device 110, the AC power box air filter 160 used to filter air passing by the AC power box 130, and/or any suitable number of air filters 140, 160. The air filters 140, 160 may be manufactured in various sizes, such as a relatively large air filter 140, a relatively small air filter 160, or any suitable number of sizes.

The medical imaging system 100 may include one or more cleaning devices 500 for automatically cleaning the one or more air filters 140, 160 described above. The cleaning device 500 may include a driving assembly 510, a linkage assembly 520 connected to the driving assembly 510, and a filter cleaning member 530 provided on the linkage assembly 520. In various embodiments, the one or more sensors 152, 172 may be positioned near each of the air filters 140, 160 so as to monitor at least one air flow characteristic of the corresponding air filters 140, 160. The cleaning device 500 may be configured to automatically clean the filters 140, 160 in response to receiving the control signal from the air filter processor 114. For example, the control signal may start the driving assembly 510. When started, the driving assembly 510 drives the linkage assembly 520 to move, so as to drive the entire filter cleaning assembly 530 to perform translational and circular motion. When moving together with the linkage assembly 520, the filter cleaning member 530 acts on the filters 140, 160 so as to clean the filters 140, 160, for example, to disengage dust and other particles from the air filters 140, 160. During the translational and circular motion, an extension direction of the filter cleaning assembly remains unchanged. For example, during cleaning, the filter cleaning assembly does not twist, and translates as a whole. During translation, each point on the filter cleaning assembly moves along a circular path. The control signal provided by the air filter processor 114 may be provided to the driving assembly 510 within a predetermined amount of time, and the predetermined amount of time is sufficient to clean the corresponding air filters 140, 160 before the cleaning device 500 is turned off.

The components of the medical imaging system 100 may be implemented in software, hardware, firmware, and the like. The various components of the medical imaging system 100 may be communicatively connected. The components of the medical imaging system 100 may be implemented separately and/or integrated in various forms.

An example of the medical imaging system 100 described above may include the ultrasonic system. FIG. 2 shows a structural diagram of an exemplary ultrasonic system 200 according to various embodiments. The ultrasonic system 200 has air inlets 210, 220 used to receive ambient-temperature air 212, 216 and an air outlet 230 used to discharge warm air 214, 218. Exemplary air filters may be respectively provided at the air inlets 210, 220.

FIG. 3 is an exploded view of the exemplary ultrasonic system 100 of FIG. 2 according to various embodiments. The ultrasonic system 200 of FIG. 2 and FIG. 3 may share various characteristics with the medical imaging system 100 of FIG. 1. Referring to FIG. 2 and FIG. 3, the ultrasonic system 200 may include a housing 202, an arm 284, a mounting member 286, a main electronic device 210, an AC power box 230, a main body air filter 240, and an AC power box air filter 260. The mounting member 286 may be configured to receive a user input apparatus 280 and/or a display system 282. The mounting member 286 may be coupled to the arm 284, and the arm 284 extends from the housing 202 and is coupled to the housing 202. The main electronic device 210, the AC power box 230, the main body air filter 240, and the AC power box air filter 260 may be provided in the housing 202. The housing 202 may include air inlets 211, 215. Ambient-temperature air 201, 205 is drawn into the housing via the air inlets 211, 215, passes through the air filters 240, 260 positioned near the air inlets 211, 215, and flows by the main body electronic device 210 or the AC power box 230. Warm air 203 is discharged via an air outlet 213 in the housing 202. Warm air 207 is discharged via another air outlet (not shown) in the housing 202. For example, ambient-temperature air 201 may be drawn in via the air inlet 211, pass through the main body air filter 240, and flow by the main electronic device 210. Heat from the main electronic device 210 may be transferred to the filtered air, and the warm air 207 may be discharged via the air outlet 213 in the housing 202. The main body air filter 240 may be mounted between the air inlet 211 and the main electronic device 210. As another example, the ambient-temperature air 205 may be drawn in via the air inlet 215, and flow by the AC power box 230 after being filtered by the air filter 260. Heat from the AC power box 230 may be transferred to the filtered air, and the warm air 207 may be discharged via an air outlet (not shown) in the housing 202. The AC power box air filter 260 may be mounted between the air inlet 215 and the AC power box 230.

Although a plurality of air inlets and a plurality of air filters may be included in the above example, the medical imaging system may be provided with only one air inlet and one air filter. For example, the medical imaging system 100 shown in FIG. 1 may alternatively include only an air inlet for flowing of the ambient-temperature air 101 and the air filter 140 near the air inlet. One or more fans (e.g., the fans 120, 134) of the medical imaging system 100 may guide the ambient-temperature air 101 entering the housing 102 to pass by one or more components to be cooled (such as the main electronic device 110 and the AC power box 130), so as to cool the one or more components, and the warm air is discharged via one or more air outlets.

FIG. 4 shows an exploded view of another exemplary ultrasonic system 400 according to various embodiments. The ultrasonic system 400 in FIG. 4 may share various characteristics with the medical imaging system 100 of FIG. 1. For example, the ultrasonic system 400 has an air inlet 411 for receiving ambient-temperature air 401 and an air outlet 413 for discharging warm air 403 and/or an air outlet 415 for discharging warm air 405. An exemplary air filter 500 may be provided at the air inlet 411 described above.

Referring to FIG. 4, the ultrasonic system 400 may include a housing 402, an arm 484, a mounting member 486, and an air filter 440. The mounting member 486 may be configured to receive a user input apparatus 480 and/or a display system 482. The mounting member 486 may be coupled to the arm 484. A main electronic device (not shown in FIG. 4), an AC power box (not shown in FIG. 4), and the air filter 440 may be provided in the housing 402. The housing 402 may include the air inlet 411. The ambient-temperature air 401 is drawn into the housing (an ultrasonic apparatus) via the air inlet 411, passes through the air filter 440 positioned near the air inlet 411, and flows by the main body electronic device and/or the AC power box. The warm air 403, 405 may be respectively discharged via the air outlets 413, 415 in the housing 402. The air filter 440 may be mounted at the air inlet 411, and specifically, may be mounted between the air inlet and a component to be cooled.

Figure 5:
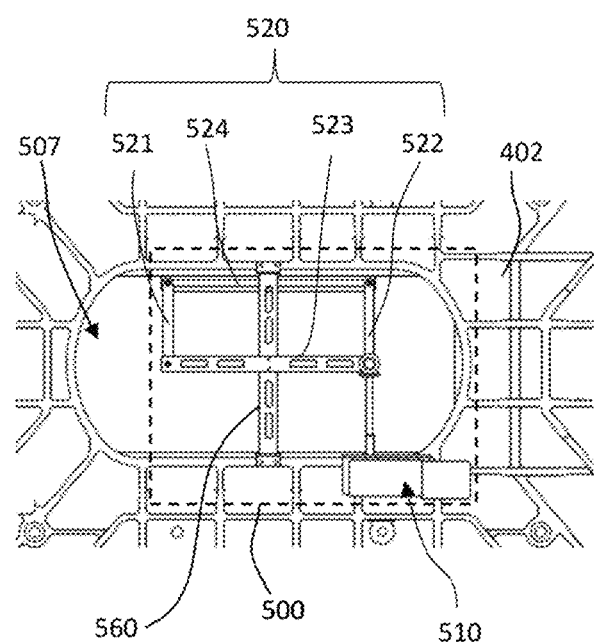
FIG. 5 shows a schematic structural diagram of an exemplary cleaning device 500 mounted in the ultrasonic system 400 according to various embodiments.

FIG. 5 shows a schematic structural diagram of an exemplary cleaning device 500 mounted in the ultrasonic system 400 according to various embodiments. Referring to FIG. 5, a housing 402 of the ultrasonic system 400 is provided with an opening 507. The opening 507 may be provided, for example, at the bottom of the housing 402 so as to communicate with the air inlet 411. The air filter 440 is mounted across the opening 507 to enable ambient-temperature air to enter the housing after passing through the opening 507 and the air filter 440. The cleaning device 500 is mounted in the housing 402, and is opposite the air filter 440 via the opening 507 so as to clean a portion of the air filter 440 exposed via the opening 507.

Figure 6:
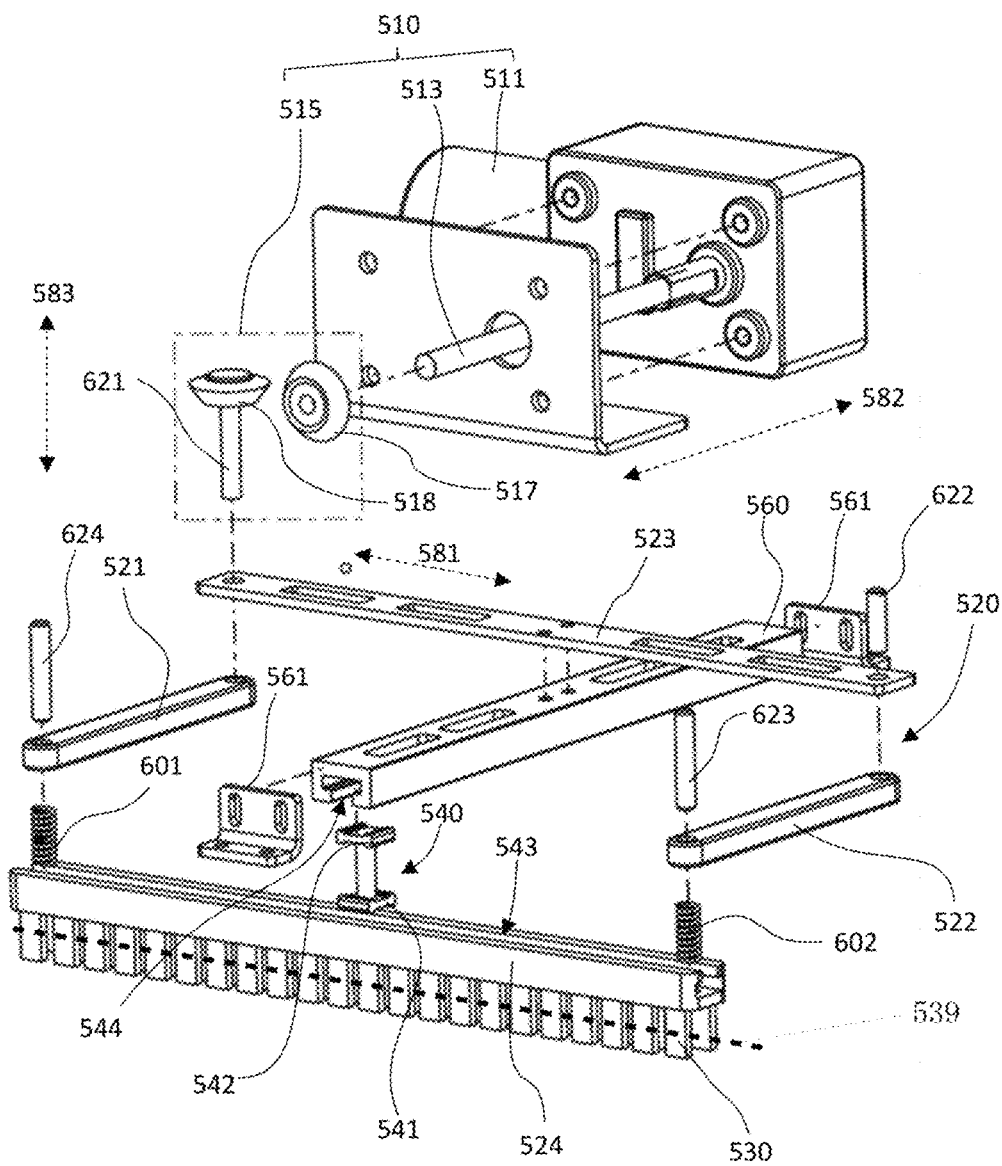
FIG. 6 shows an exploded view of the exemplary cleaning device 500 according to various embodiments.

FIG. 6 shows an exploded view of the exemplary cleaning device 500 according to various embodiments. Referring to FIG. 5 and FIG. 6, the cleaning device 500 may include a driving assembly 510, a linkage assembly 520, and a filter cleaning assembly 530. The linkage assembly 520 is connected to the driving assembly 510. The filter cleaning assembly 530 is provided on the linkage assembly 520. The driving assembly 510 is used to drive the linkage assembly 520 to move, so as to drive the entire filter cleaning assembly 530 to perform translational and circular motion. During the translational and circular motion, an extension direction of the filter cleaning assembly remains unchanged.

The driving assembly 510 is used to, in response to a received control signal, drive the linkage assembly to move so as to drive the filter cleaning assembly 530 to move relative to the air filter 440 (or air filters 140, 160, 24, 260) to clean the air filter 440. A motion path of each point on an extension shaft 539 of the filter cleaning assembly 530 forms at least a portion of a circle or at least a portion of a plurality of repeating circles, and the extension shaft 539 extends in a first extension direction (as indicated by an arrow 581) at any time in the motion.

In an example, the length of the motion path of each point may be N*P, where P is the perimeter of the circumference described above, and N is a number greater than 0, may be a natural number or a decimal, and may be, for example, 1, 0.8, 2, 1.6, 3.5, etc.)

In another example, the motion of each point may be reciprocating motion performed along a portion of a circumference (e.g., a half circle or a ¾ circle).

In another example, the motion of each point may be clockwise or counterclockwise motion performed along a portion of a circumference (e.g., a half circle or a ¾ circle). For example, when the cleaning device 500 is started for the first time, the filter cleaning assembly moves clockwise by a half circle or a ¾ circle, and then stops. When the cleaning device 500 is started again, clockwise rotation is continued, and is performed by a half circle or a ¾ circle starting from the last stop position.

In another example, the motion of each point may be reciprocating motion performed along an entire circumference. For example, the filter cleaning assembly 530 is rotated clockwise by one circle, and is then rotated counterclockwise by one circle, and this is repeated one or more times. Such repetitions may be performed within the same cleaning task, or may be performed one by one at a plurality of cleaning tasks performed at intervals.

In another example, the motion of each point may be clockwise or counterclockwise motion performed along an entire circumference. For example, when the cleaning device 500 is started for the first time, the filter cleaning assembly 530 moves clockwise by one circle or by an integer number of circles, and then stops. When the cleaning device 500 is started again, the filter cleaning assembly 530 moves again clockwise by one circle or by an integer number of circles.

The plurality of repeating circles described above may be circles where a plurality of trajectories formed by the filter cleaning assembly by performing any reciprocating motion or clockwise or counterclockwise rotation described above are located.

When the entire filter cleaning device performs translational and circular motion, each portion (or each point) thereof moves synchronously, for example, having the same direction, velocity, and angular velocity of motion.

Figure 7:
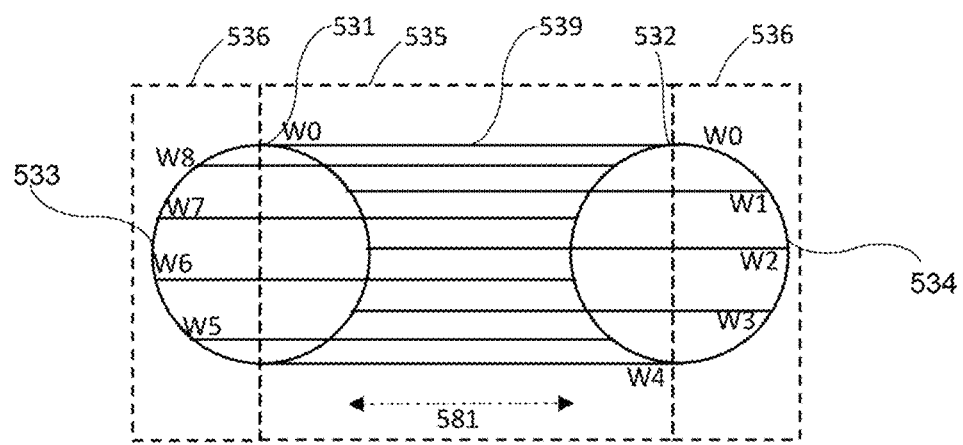
FIG. 7 shows an example of a motion path of a filter cleaning assembly.

FIG. 7 shows an example of a motion path of a filter cleaning assembly. For example, starting from a position w0, the filter cleaning assembly 530 (shown by the extension shaft 539) passes by positions w1 to w8 sequentially, and then returns to the position w0. The filter cleaning assembly 530 has an extended portion extending in the first extension direction, and during motion, the first extension direction remains unchanged. Two points 531 and 532 at two ends of the filter cleaning assembly 530 are used as an example. Respective motion of the two points 531 and 532 is performed synchronously, and respectively forms circular motion trajectories 533 and 534. A connecting line between two centers of circles of the circular trajectories 533 and 534 is always in the first extension direction. Thus, the filter cleaning assembly 530 as a whole can traverse a region to be cleaned where the trajectories 533 and 534 are located. The region to be cleaned is continuous, and includes at least one intermediate portion 535 and two curved portions 536 located on two sides of the intermediate portion. On the basis of an overall profile (or shape) of the filter cleaning assembly 530, the shape of the region may have other variations.

The shape of the opening 507 may be configured to be adapted to the region to be cleaned. As an example, the shape of the opening 507 may also include one intermediate portion and two curved portions located on two sides of the intermediate portion.

Referring to FIG. 5 and FIG. 6, the linkage assembly 520 includes a first crank 521, a second crank 522, a support 523, and a mounting frame 524. The first crank 521, the support 523, the second crank 522, and the mounting frame 524 are sequentially connected to each other to form a linkage structure in the shape of a parallelogram. For example, the first crank 521, the support 523, the second crank 522, and the mounting frame 524 are sequentially hinge-connected or movably connected, and central axes thereof respectively define a parallelogram. Specifically, the first crank 521 and the second crank 522 are configured to be opposite each other, and are parallel to each other, and the support 523 and mounting frame 524 are configured to be opposite each other, and are parallel to each other.

The support 523 is used to be fixed relative to the medical imaging system. For example, the support 523 may span the opening 507 horizontally, and may be mounted on the housing 402. Specifically, two ends of the support 523 may extend respectively in horizontal directions, and be mounted at a side edge of the opening 507. Alternatively, the support 523 is mounted on a position-limiting frame 560, and this method will be described below in combination with description of the position-limiting frame 560.

In other embodiments, the housing 402 may also be used for the support 523 so that the support 523 is hinge-connected or movably connected to the first crank and the second crank directly.

The mounting frame 524 is used to mount the filter cleaning assembly 530 described above. When either one of the first crank 521 and the second crank 522 is driven, the other one of the first crank 521 and the second crank 522 is moved in a linked manner by means of the mounting frame 524. The driving assembly 510 is used to be connected to at least one of the first crank 521 and the second crank 522 so as to drive the first crank 521 and the second crank 522 to rotate around respective ends thereof, and drive the entire mounting frame 524 to perform translational and circular motion.

Specifically, the first crank 521, the second crank 522, the support 523, and the mounting frame 524 each have a first end and a second end opposite each other. The first end of the first crank 521 is connected to the first end of the support 523 by means of a first connecting shaft 621. The second end of the support 523 is connected to the first end of the second crank 522 by means of a second connecting shaft 622. The second end of the second crank 522 is connected to the first end of the mounting frame 524 by means of a third connecting shaft 623. The second end of the mounting frame 524 is connected to the second end of the first crank 521 by means of a fourth connecting shaft 624. The driving assembly 510 is used to be connected to at least one of the first connecting shaft 621 and the second connecting shaft 622, so as to drive the corresponding at least one of the first connecting shaft 621 and the second connecting shaft 622 to rotate, and drive the corresponding first crank 521 and second crank 522 to rotate about the respective first ends thereof (or respectively about the first connecting shaft 621 and the second connecting shaft 622).

Referring to FIG. 5 and FIG. 6, in an embodiment, the driving assembly 510 includes a motor 511 and a drive shaft 513. The motor 511 may be mounted in the housing 402 of the ultrasonic system 400. The motor 511 may be connected to a first end of the drive shaft 513, and drive, in response to a control signal, the drive shaft 513 to rotate. A second end of the drive shaft 513 is used to be connected to the first connecting shaft 621, and drive the first connecting shaft 621 to rotate, so as to drive the first crank 521 to rotate about the first connecting shaft 621.

The driving assembly 510 may also include a gear drive assembly 515 connected between the drive shaft 513 and the first connecting shaft 621 so as to change the direction of rotational force of the drive shaft 513, and then transmit the same to the first connecting shaft 621.

The gear drive assembly 515 may include a first bevel gear 517 and a second bevel gear 518 that mesh with each other. The first bevel gear 517 engages with the drive shaft 513, and the second bevel gear 518 engages with the first connecting shaft 621. A central axis of the first bevel gear 517 extends in a second extension direction (as indicated by an arrow 582). A central axis of the second bevel gear 518 extends in a third extension direction (as indicated by an arrow 583). The second extension direction and the third extension direction are perpendicular to each other. On the basis of such a setting, the drive shaft 513 may be configured to extend in the second extension direction, and the first connecting shaft 621 may be configured to extend in the third extension direction. It will be appreciated that the second extension direction described above may also be the same as the first extension direction depending on different mounting positions of the motor 511.

In other embodiments, the drive shaft 513 and the first connecting shaft 621 may be alternatively configured to extend in the same direction. That is, the first connecting shaft 621 is configured to extend in the third extension direction. In this case, rotation of the drive shaft 513 can be directly transmitted to the first crank 521 without the need of using the gear drive assembly 515.

Although the drive shaft 513 and the first connecting shaft 621 cooperate with each other to drive the first crank 521 in the example in FIG. 5 and FIG. 6, it can be appreciated that the drive shaft 513 may also cooperate with the second connecting shaft 622 to drive the second crank 522. The first crank 521 and the second crank 522 are connected by means of the mounting frame 524, so that when either one of the first crank 521 and the second crank 522 is driven, the other one is driven accordingly.

In various embodiments of the present invention, the filter cleaning assembly 530 may include a filter brush or cleaning cloth. The filter brush and cleaning cloth, etc. may be used to abut a side of an air filter to be cleaned. Alternatively, the filter cleaning assembly 530 does not need to abut the air filter, and may, for example, have a non-contact dust adsorption function.

Referring to FIG. 6, a first elastic component 601 is provided between the mounting frame 524 and the first crank 521, and a second elastic component 602 is provided between the mounting frame 524 and the second crank 522. The first elastic component 601 and the second elastic component 602 are used to provide pressure to the mounting frame 524 to enable the filter cleaning assembly 530 mounted on the mounting frame 524 to sufficiently act on (e.g., contacting, abutting, etc.) the air filter to be cleaned. The first elastic component 601 and the second elastic component 602 may respectively include compression springs sleeving the fourth connecting shaft 624 and the third connecting shaft 623.

Referring to FIG. 5 and FIG. 6, the cleaning device 500 further includes a position-limiting assembly 540 and the position-limiting frame 560. The position-limiting frame 560 may be mounted on the housing 402. The position-limiting frame 560 has an extended portion in the second extension direction (as indicated by the arrow 582). The second extension direction and the first extension direction (an extension direction of the support 523) are perpendicular to each other. Specifically, the position-limiting frame 560 may span the opening 507 in the first extension direction, and two ends thereof are respectively mounted on the side edge of the opening 507 by means of a mounting member 561. Each of the position-limiting frame 560 and the support 523 is connected in a central position thereof to the other. For example, the position-limiting frame 560 and the support 523 are connected to each other to form a "cross" shape, and an intersection point of the "cross" shape is located in the center of the "cross" shape.

The position-limiting assembly 540 is configured to engage with the mounting frame 524, and can move between the respective second ends of the first crank 521 and the second crank 522 in the first extension direction. The position-limiting assembly 540 is further configured to engage with the position-limiting frame 560, and can move in the second extension direction. In this way, it is ensured that the first crank 521 and the second crank 522 rotate synchronously, thereby preventing the cranks from rotating randomly.

Specifically, the position-limiting assembly 540 may further include a first slide member 541 and a second slide member 542 that are connected to each other. The mounting frame 524 is provided with a slide rail 543 used to engage with the first slide member 541. The position-limiting frame 560 is provided with a slide rail 544 used to engage with the second slide member 542. An example of the slide member and the slide rail may include a slider and a chute.

The position-limiting assembly 540 is used to limit the position of the driven mounting frame 524, so as to limit the motion path of the filter cleaning assembly 530 mounted thereon.

Although the position-limiting assembly is employed in the example in FIG. 6, synchronous motion of the cranks can be achieved in any other manner. For example, the driving assembly 510 may be used to drive the first crank 521, and an additional driving assembly is used to drive the second crank 522, as long as the two driving assemblies are configured to be synchronous.

Figure 8:
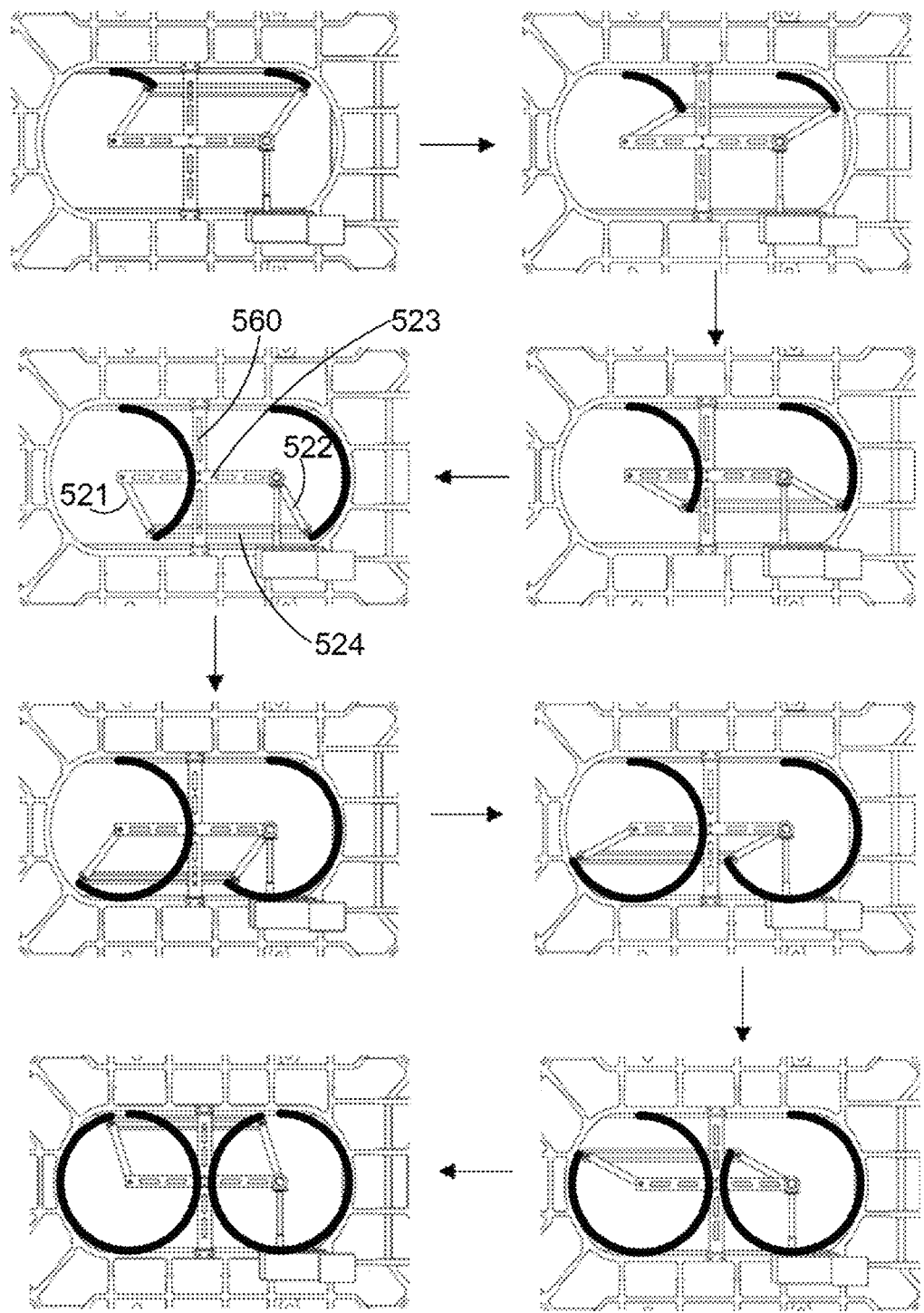
FIG. 8 shows a state diagram of a linkage assembly moving from a starting position to a plurality of different positions.

Referring to FIG. 8, FIG. 8 shows a state diagram of the linkage assembly 520 moving from a starting position shown in FIG. 5 to a plurality of different positions (the first crank and the second crank rotate by different angles). A traverse path of the mounting frame 524 is schematically indicated by an arc. The mounting frame 524 extends in each position horizontally other than in an inclined manner. Each time the two cranks rotate by one revolution, the mounting frame 524 and the filter cleaning assembly 530 thereon can traverse a region to be cleaned having a relatively large range.

In the above example, the planar region to be cleaned is disclosed. However, when a surface to be cleaned is a curved surface or a relief surface, the shape of the filter cleaning assembly or the mounting member where the filter cleaning assembly is located may be correspondingly changed, or the filter cleaning assembly is configured to be elastically deformable.

When product design is performed, the size of a two-crank structure or the size of the filter cleaning assembly 530 can be determined, so as to match the size of the air filter to be cleaned.

The cleaning device 500 may be configured to automatically clean the filter in response to receiving the control signal from the air filter processor 114. For example, the control signal may start the motor 511. The motor 511 may be configured to drive a crank in a two-crank mechanism to perform translational and circular motion around one end thereof, so that an entire connecting rod provided on the other end of the crank performs translational and circular motion and traverses the region to be cleaned. The connecting rod is used to bear the filter cleaning assembly 530. In addition, the region to be cleaned is opposite or coincides with the surface to be cleaned of the filter, so that the filter cleaning assembly 530 moving along with the connecting rod acts on the filter to clean the filter, for example, to disengage dust and other particles from the filter, thereby cleaning the filter without user intervention (that is, automatically). The control signal provided by the air filter processor 114 may be provided to the motor 511 within a predetermined amount of time, and the predetermined amount of time is sufficient to clean the filter before the motor is turned off.

In various embodiments of the present invention, the air filter processor 114 is further used to receive a status feedback signal from the cleaning device 500, and determine, on the basis of the status feedback signal, whether a cleaning task for the air filter has been completed, so as to control the cleaning device 500 to stop working, that is, stopping the cleaning task.

Specifically, the status feedback signal may include an amount of rotation from the motor 511 in a current cleaning task. When the amount of rotation reaches a preset value, the air filter processor 114 determines that the cleaning device has completed one cleaning task. The preset value of the amount of rotation described above may be set on the basis of an amount of rotation of the motor required by motion of the filter cleaning assembly 530 from a starting point of the region to be cleaned to an end point. For example, the preset value of the amount of rotation may be set on the basis of rotation of the motor required by one revolution of the filter cleaning assembly 530.

Figure 9:
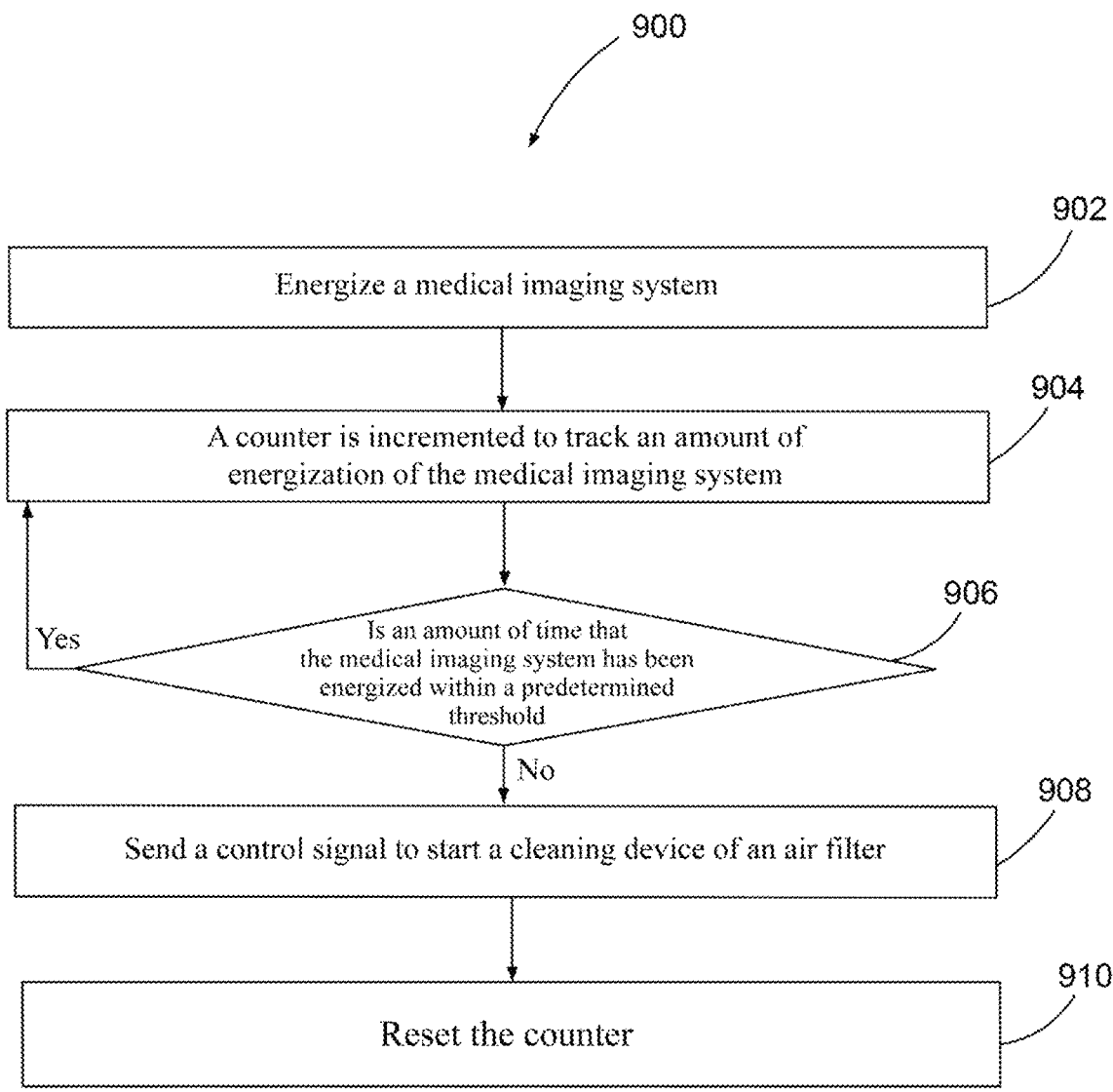
FIG. 9 shows a flowchart 900 of exemplary steps according to various embodiments.

FIG. 9 shows a flowchart 900 of exemplary steps 902 to 910 according to various embodiments. The exemplary steps may be used to automatically clean an air filter of a medical imaging system 100 (e.g., including the ultrasonic system 200/400) on the basis of an amount of time that the medical imaging system 100 has been energized.

At step 902, the medical imaging system 100 is energized. For example, a user may flip a switch, press a button, insert a power cord, and the like to turn on the medical imaging system 100. The energization of the medical imaging system 100 causes an AC power box 130 to receive alternating current (AC) power that is converted by an AC/DC converter to a direct current (DC) used to power components of the medical imaging system 100.

At step 904, a counter 118 increases progressively to track the amount of time that the medical imaging system 100 has been energized. For example, the counter 118 may include logic, a circuit, an interface, and/or code that is suitable, and the logic, circuit, interface, and/or code is operable to track the amount of time that the medical imaging system 100 has been energized. The counter 118 may be configured to increase progressively continuously when the medical imaging system 100 is energized, until the medical imaging system 100 is powered off.

At step 906, an air filter processor 114 of the medical imaging system 100 may determine whether the amount of time that the medical imaging system 100 has been energized is within a predetermined threshold. For example, the air filter processor 114 may be configured to monitor the counter 118 continuously or periodically, so as to determine when a current energized time of the medical imaging system 100 exceeds a predetermined threshold. The predetermined threshold may be set by a manufacturer, a vendor, a user, etc. For example, the predetermined threshold may be 7 days, 30 days, 60 days, or any suitable amount of time. If the air filter processor 114 determines that the predetermined threshold has not been exceeded, then the process may return to step 904. If the air filter processor 114 determines that the predetermined threshold has been exceeded, then the process proceeds to step 908.

At step 908, the air filter processor 114 of the medical imaging system 100 may send a control signal to start a cleaning device 500 of an air filter, so as to automatically clean the air filter. For example, the air filter processor 114 may be configured to send the control signal to a driving assembly 510 of the cleaning device 500. The driving assembly 510 is connected to a linkage assembly 520. The linkage assembly 520 is used to mount a filter cleaning assembly 530. The driving assembly 510 is used to drive the linkage assembly 520 to move, so as to drive the entire filter cleaning assembly 530 to perform translational and circular motion. During the translational and circular motion, an extension direction of the filter cleaning assembly remains unchanged. The filter cleaning assembly 530 is configured to be opposite or to contact an air filter to be cleaned, so as to clean the air filter during motion.

At step 910, the air filter processor 114 of the medical imaging system 100 may reset the counter 118. For example, the counter 118 may be reset, and the process returns to step 704, where the counter 118 begins increasing progressively to track the amount of time that the medical imaging system 100 has been energized since resetting.

Figure 10:
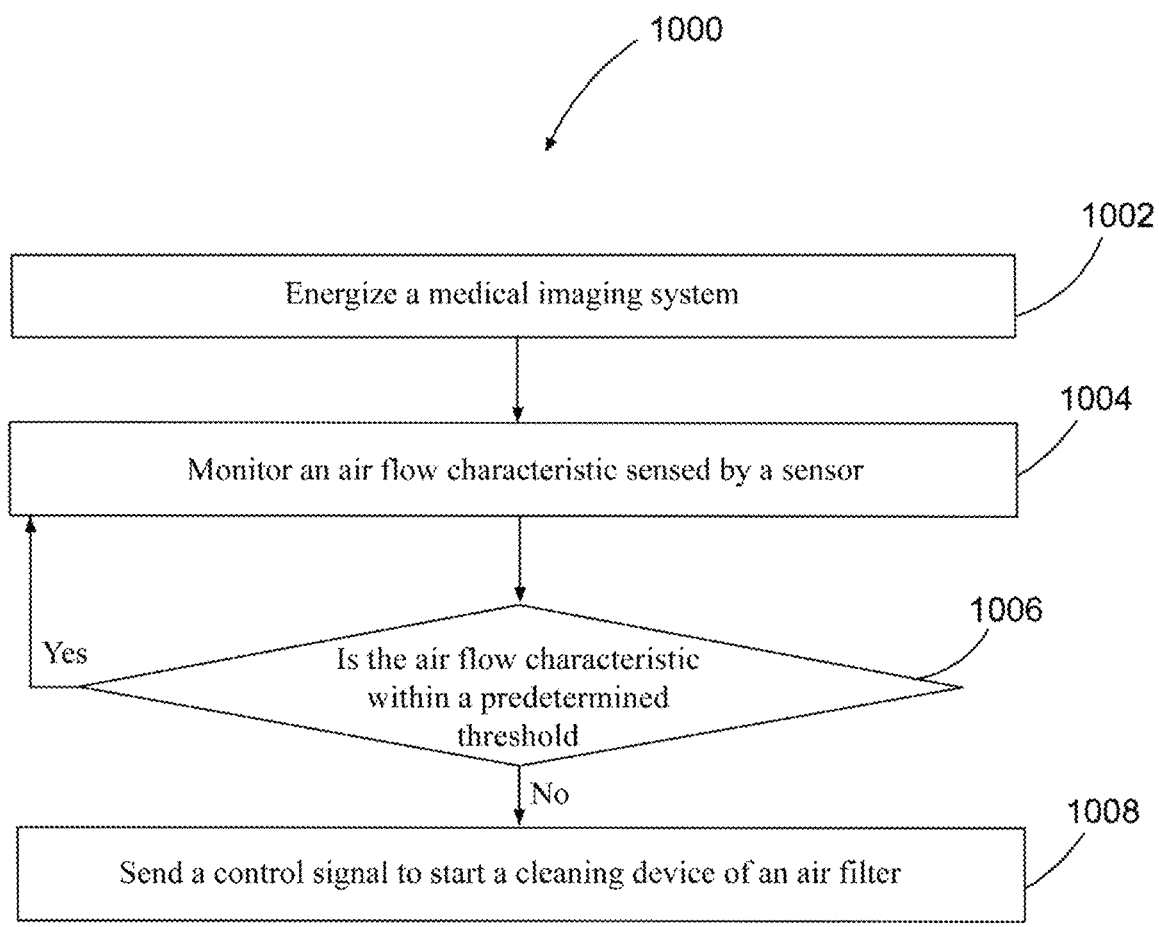
FIG. 10 shows a flowchart 1000 of exemplary steps according to various embodiments.

FIG. 10 shows a flowchart 700 of exemplary steps 1002 to 1008 according to various embodiments. The exemplary steps may be used to automatically clean an air filter of a medical imaging system 100 on the basis of a measured air flow characteristic.

At step 1002, the medical imaging system 100 is energized. For example, a user may flip a switch, press a button, insert a power cord, and the like to turn on the medical imaging system 100. The energization of the medical imaging system 100 causes an AC power box 130 to receive alternating current (AC) power that is converted by an AC/DC converter to a direct current (DC) used to power components of the medical imaging system 100.

At step 1004, the air filter processor 114 of the medical imaging system 100 may monitor an air flow characteristic sensed by sensors 152, 172. For example, a sensor 1 positioned at the air filter may measure an air flow characteristic, and provide the air flow characteristic to the air filter processor 114. The air flow characteristic may include a mass flow rate of the air filter 1, a pressure drop across the air filter 1, or any suitable air flow characteristic. The sensor 1 may be a mass flow rate sensor, a differential pressure transducer, or any suitable sensor.

At step 1006, the air filter processor 114 of the medical imaging system 100 may determine whether the air flow characteristic is within a predetermined threshold. For example, the air filter processor 114 may continuously or periodically monitor the air flow characteristic provided by the sensor, so as to determine when the air flow characteristic of one or more air filters of the medical imaging system 100 is outside the predetermined threshold. The predetermined threshold may be set by a manufacturer, a vendor, a user, etc. For example, the predetermined threshold may be a minimum mass flow rate, a maximum pressure drop, or any suitable value of the air flow characteristic. If the air filter processor 114 determines that the air flow characteristic of a specific air filter does not fall outside a predetermined threshold associated with the specific air filter, then the process returns to step 1004. If the air filter processor 114 determines that the air flow characteristic of the specific air filter falls outside the predetermined threshold associated with the specific air filter, then the process proceeds to step 1008.

At step 1008, the air filter processor 114 of the medical imaging system 100 may send a control signal to start a cleaning device 500, so as to automatically clean one or more air filters. For example, the air filter processor 114 may be configured to send a control signal to one or more air filters of the medical imaging system 100. The air filter processor 114 of the medical imaging system 100 may send the control signal to start the cleaning device 500 of the air filter, so as to automatically clean the air filter. For example, the air filter processor 114 may be configured to send the control signal to a driving assembly 510 of the cleaning device 500. The driving assembly 510 is connected to a linkage assembly 520. The linkage assembly 520 is used to mount a filter cleaning assembly 530. The driving assembly 510 is used to drive the linkage assembly 520 to move, so as to drive the entire filter cleaning assembly 530 to perform translational and circular motion. During the translational and circular motion, an extension direction of the filter cleaning assembly remains unchanged. The filter cleaning assembly 530 is configured to be opposite or to contact an air filter to be cleaned, so as to clean the air filter during motion.

Figure 11:
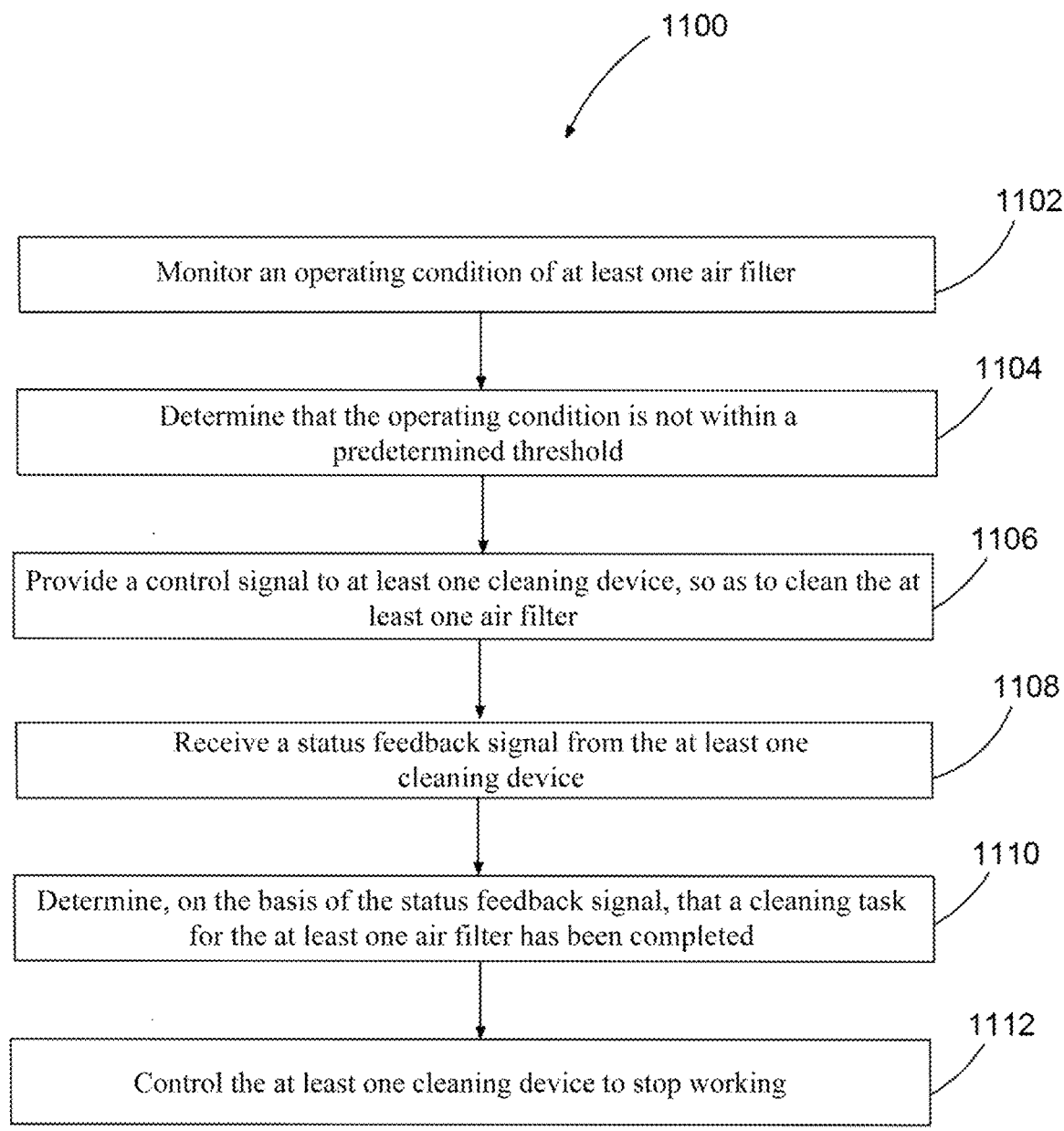
FIG. 11 shows a flowchart 1100 of exemplary steps according to various embodiments.

Referring to FIG. 11, FIG. 11 shows a flowchart 1100 of exemplary steps according to various embodiments. At step 1102, monitoring an operating condition of at least one air filter. At step 1104, determining that the operating condition is not within a predetermined threshold. At step 1106, providing the control signal to the at least one cleaning device.

In an optional embodiment, steps 1108 to 1112 may be further included. In step 1108, receiving a status feedback signal from the at least one cleaning device 500. In step 1110, determining, on the basis of the status feedback signal, that a cleaning task for the at least one air filter has been completed. In step 1112, in response to that the cleaning task for the at least one air filter has been completed, controlling the at least one cleaning device 500 to stop working.

Figure 12:
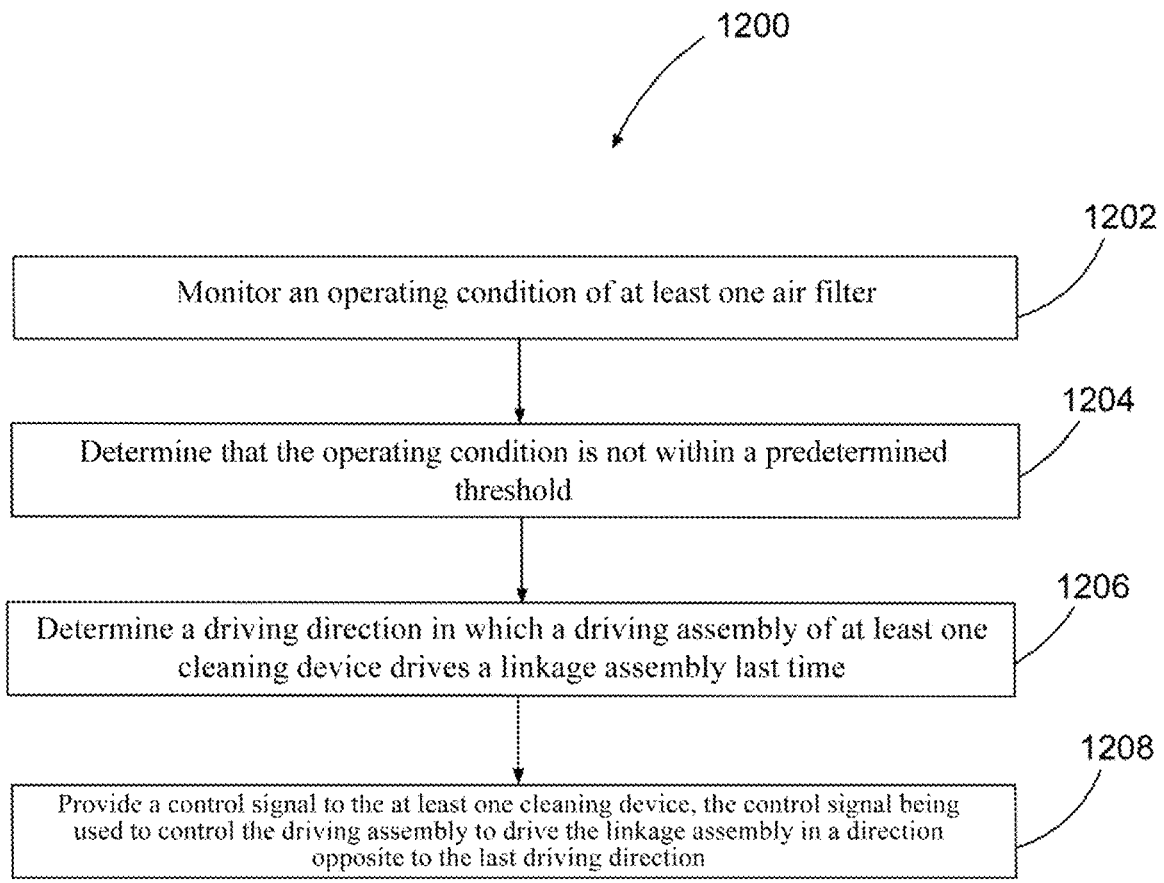
FIG. 12 shows a flowchart 1200 of exemplary steps according to various embodiments.

Referring to FIG. 12, FIG. 12 shows a flowchart 1200 of exemplary steps according to various embodiments. At step 1202, monitoring an operating condition of at least one air filter. At step 1204, determining that the operating condition is not within a predetermined threshold. At step 1206, determining a driving direction in which a driving assembly 510 of the at least one cleaning device 500 drives a linkage assembly last time. At step 1208, providing a control signal to the at least one cleaning device, the control signal being used to control the driving assembly to drive the linkage assembly in a direction opposite to the last driving direction.

In this way, a motion dead point caused by a motion error of the linkage assembly is avoided. An example of the motion dead point may include: the first crank and the second crank cannot be driven again when the first crank and the second crank lose inertia when rotation stops since the extension shafts thereof are on the same straight line.

In an optional embodiment, steps 1114 to 1112 may be further included. In step 1108, receiving a status feedback signal from the at least one cleaning device 500. In step 1110, determining, on the basis of the status feedback signal, that a cleaning task for the at least one air filter has been completed. In step 1112, in response to that the cleaning task for the at least one air filter has been completed, controlling the at least one cleaning device 500 to stop working.

In an exemplary embodiment, the methods of the above embodiments may include: drawing, by at least one fan, air into the housing via at least one air inlet. The methods 900 and 1000 may include: causing, by at least one fan, air to pass through at least one air filter. The methods of the above embodiments may further include: causing, by at least one fan, air to pass by an electronic device provided in the housing. The methods of the above embodiments may further include: discharging, by at least one fan, air via at least one air outlet.

In some schemes of the methods of the above embodiments, one or more steps may be omitted, and/or steps are performed in an order different than a provided order, and/or some steps discussed below are combined. For example, some steps may not be performed in certain embodiments. As another example, certain steps may be performed in a chronological order different than a chronological order provided below, which includes the case in which certain steps are simultaneously performed.

According to various embodiments, provided is a cleaning device of an air filter of a medical imaging system, including a driving assembly 510, a linkage assembly 520, and a filter cleaning assembly 530. The filter cleaning assembly 530 is mounted on the linkage assembly 520. The driving assembly 510 is used to, in response to a received control signal, drive the linkage assembly 520 to move so as to drive the filter cleaning assembly 530 to move relative to the air filter to clean the air filter. A motion path of each point on an extension shaft 539 of the filter cleaning assembly 530 forms at least a portion of a circle or at least a portion of a plurality of repeating circles, and the extension shaft 539 extends in a first extension direction at any time in the motion.

According to various embodiments, provided is a cleaning device of an air filter of a medical imaging system, including a driving assembly 510, a linkage assembly 520, and a filter cleaning assembly 530. The linkage assembly 520 includes a first crank 521, a second crank 522, and a mounting frame 524. Central axes of the first crank 521 and the second crank 522 are configured to be parallel to each other. The first crank 521, the second crank 522, and the mounting frame 523 each include a first end and a second end. The first end and the second end of the mounting frame 523 are respectively hinge-connected to the second end of the first crank 521 and the second end of the second crank 522. The filter cleaning assembly 530 is mounted on the mounting frame 523. The driving assembly 510 is connected to at least one of the first crank 521 and the second crank 522. The driving assembly 510 is used to, in response to a received control signal, drive the first crank 521 and the second crank 522 of the linkage assembly to rotate about the respective first ends thereof, and drive the filter cleaning assembly 530 to move relative to the air filter to clean the air filter.

In an embodiment, the linkage assembly includes a first crank 521, a second crank 522, a support 523, and a mounting frame 524. The first crank 521, the support 523, the second crank 522, and the mounting frame 524 are hinge-connected sequentially, and for example, form a parallelogram. The filter cleaning assembly 530 is mounted on the mounting frame 524. The driving assembly 510 is used to be connected to at least one of the first crank 521 and the second crank 522, so as to drive the first crank 521 and the second crank 522 to rotate about respective first ends thereof, and drive the mounting frame 524 and the filter assembly 530 thereon to move.

In an embodiment, the support 523 is used to be fixed relative to a housing of the medical imaging system, or the support includes a portion of the housing.

In an embodiment, the first end of the first crank 521 is connected to a first end of the support 523 by means of a first connecting shaft 621, and a second end of the support 523 is connected to the first end of the second crank 522 by means of a second connecting shaft 622, the driving assembly 510 being used to be connected to at least one of the first connecting shaft 621 and the second connecting shaft 622, so as to drive the corresponding at least one of the first connecting shaft 621 and the second connecting shaft 622 to rotate, and drive the corresponding first crank 521 and second crank 522 to rotate about the respective first ends thereof.

In an embodiment, the driving assembly 510 includes a motor 511 and a drive shaft 513. A first end of the drive shaft 513 is used to be connected to the first connecting shaft 621. The motor 511 is connected to a second end of the drive shaft 513. The motor 511 is used to, in response to the control signal, drive the drive shaft 513 to rotate, and drive the first connecting shaft 621 to rotate.

In an embodiment, the driving assembly 510 further includes a gear drive assembly 515 connected between the drive shaft 513 and the first connecting shaft 621, and the gear drive assembly 515 is used to change the direction of rotational force of the drive shaft 513, and then transmit the same to the first connecting shaft 621.

In an embodiment, a first elastic component 601 is provided between the mounting frame 524 and the first crank 521, and a second elastic component 602 is provided between the mounting frame 524 and the second crank 522.

In an embodiment, during the translational and circular motion, an extension direction of the filter cleaning assembly 530 remains unchanged.

In an embodiment, the support 523 is configured to extend in a first direction, and the cleaning device 500 further includes a position-limiting frame 560 and a position-limiting assembly 540, the position-limiting frame 560 being configured to extend in a second extension direction, the first extension direction and the second extension direction being perpendicular to each other, the position-limiting assembly 540 being configured to engage with the mounting frame 530 so as to move in the first extension direction, and the position-limiting assembly 540 being further configured to engage with the position-limiting frame 560 so as to move in the second extension direction.

In an embodiment, each of the position-limiting frame 560 and the support 523 is connected in a central position thereof to the other.

In an embodiment, the filter cleaning assembly 530 is used to traverse a region to be cleaned, and the region to be cleaned includes at least one intermediate portion 535 and two curved portions 536 respectively connected to two sides of the intermediate portion 535.

According to various embodiments, also provided is a medical imaging system, including a housing 101, 202, 402 having at least one air inlet and at least one air outlet. The system further includes at least one air filter 140, 160, 240, 260, 440 provided between the at least one air inlet and the at least one air outlet. The system further includes at least one cleaning device 500 mounted on the housing 101, 202, 402. A filter cleaning assembly 530 of the at least one cleaning device 500 is configured to be opposite to the at least one air filter 140, 160, 240, 260, 440, so as to clean the at least one air filter 140, 160, 240, 260, 440 during motion.

In an embodiment, the system further includes at least one processor, e.g., an air filter processor 114, configured to: monitor an operating condition of the at least one air filter 140, 160, 240, 260, 440; determine that the operating condition is not within a predetermined threshold; and in response to that the operating condition is not within the predetermined threshold, provide the control signal.

According to various embodiments, also provided is a cleaning method of an air filter of a medical imaging system, including: monitoring an operating condition of at least one air filter 140, 160, 240, 260, 440; determining that the operating condition is not within a predetermined threshold; and providing the control signal to the at least one cleaning device 500.

In an embodiment, the method further includes: receiving a status feedback signal from the at least one cleaning device 500; determining, on the basis of the status feedback signal, that a cleaning task for the at least one air filter has been completed; and in response to that the cleaning task for the at least one air filter has been completed, controlling the at least one cleaning device 500 to stop working.

As used herein, the term "circuit" refers to physical electronic components (i.e., hardware) and any software and/or firmware ("code") that can be provided with hardware, executed by hardware, and/or associated with hardware in other manners. For example, as used herein, when performing one or more pieces of first code, a particular processor and memory may include a first "circuit" and when performing one or more pieces of second code, the particular processor and memory may include a second "circuit". As used herein, "and/or" indicates any one or more of items on a list that are connected by "and/or". For example, "x and/or y" represents any element in a three-element set {(x), (y), (x, y)}. As another example, "x, y, and/or z" represents any element in a seven-element set {(x), (y), (z), (x, y), (x, z), (y, z), (x, y, z)}. As used herein, the term "exemplary" indicates use as a non-limiting example, instance, or illustration. As used herein, the terms "e.g." and "for example" introduce a list of one or more non-limiting examples, instances, or illustrations. As used herein, the circuit "is operable to" and/or "is configured to", whenever the circuit includes necessary hardware and code (if necessary) for implementing a function, implement the function no matter whether implementation of the function is disabled via some user configurable settings or is not activated.

Other embodiments may provide a computer-readable apparatus and/or a non-transitory computer-readable medium, and/or a machine-readable apparatus and/or a non-transitory machine-readable medium storing machine code and/or a computer program having at least one code segment executable by a machine and/or a computer, so that the machine and/or the computer perform the steps for automatically cleaning an air filter of a medical imaging system as described herein.

Therefore, the present disclosure may be implemented in hardware, software, or a combination of hardware and software. The present disclosure may be implemented in at least one computer system in a centralized manner, or in a distributed manner in which different elements are distributed over a number of interconnected computer systems. Any type of computer system or other devices suitable for performing the methods described herein are appropriate.

The various embodiments may also be embedded in a computer program product that includes all features capable of implementing the methods described herein, and the computer program product is capable of performing these methods when loaded into a computer system. A computer program herein refers to any expression of a set of instructions expressed in any language, code, or symbol. These instructions are intended to cause a system capable of information processing to perform a particular function directly or after two or one of the following: a) conversion to another language, code, or symbol; b) copying in different material forms.

Although the present disclosure has been described with reference to certain embodiments, it will be appreciated by those skilled in the art that various changes can be made and equivalents can be replaced without departing from the scope of the present disclosure. In addition, many modifications may be made to adapt a particular situation or material to the teachings of the present disclosure without departing from the scope of the present disclosure. Therefore, the present disclosure is not intended to be limited to the particular embodiments disclosed, and instead, the present disclosure include all embodiments falling within the scope of the appended claims.

The invention claimed is:

1. A cleaning device of an air filter of a medical imaging system, comprising:
a linkage assembly;
a filter cleaning assembly, mounted on the linkage assembly; and
a driving assembly, connected to the linkage assembly and configured to, in response to a received control signal, to drive the linkage assembly to move so as to drive the filter cleaning assembly to move relative to the air filter to clean the air filter, a motion path of each point on an extension shaft of the filter cleaning assembly forming at least a portion of a circle or at least a portion of a plurality of repeating circles, and the extension shaft extending in a first extension direction at any time in the motion,
wherein the linkage assembly comprises a first crank, a second crank, a support, and a mounting frame, the first crank, the support, the second crank, and the mounting frame being sequentially hinge-connected, central axes of the first crank, the support, the second crank, and the mounting frame defining a parallelogram, the filter cleaning assembly being mounted on the mounting frame, and the driving assembly being connected to at least one of the first crank and the second crank, so as to drive the first crank and the second crank to rotate about respective first ends thereof, and to drive the mounting frame and the filter assembly thereon to move.

2. The device according to claim 1, wherein the support is fixed relative to a housing of the medical imaging system, or the support comprises a portion of the housing.

3. The device according to claim 1, wherein the first end of the first crank is connected to a first end of the support by means of a first connecting shaft, a second end of the support is connected to the first end of the second crank by means of a second connecting shaft, and the driving assembly is connected to at least one of the first connecting shaft and the second connecting shaft, so as to drive the corresponding at least one of the first connecting shaft and the second connecting shaft to rotate, and configured to drive the corresponding first crank and second crank to rotate about the respective first ends thereof.

4. The device according to claim 1, wherein the driving assembly comprises a motor and a drive shaft, a first end of the drive shaft being connected to the first connecting shaft, the motor being connected to a second end of the drive shaft, and the motor being configured to, in response to the control signal, drive the drive shaft to rotate, and drive the first connecting shaft to rotate.

5. The device according to claim 4, wherein the driving assembly further comprises a gear drive assembly connected between the drive shaft and the first connecting shaft, wherein the gear drive assembly is configured to change the direction of rotational force of the drive shaft, and then transmit the same to the first connecting shaft.

6. The device according to claim 1, wherein a first elastic component is provided between the mounting frame and the first crank, and a second elastic component is provided between the mounting frame and the second crank.

7. The device according to claim 1, wherein the support is configured to extend in the first extension direction, and the cleaning device further comprises a position-limiting frame and a position-limiting assembly, the position-limiting frame being configured to extend in a second extension direction, the first extension direction and the second extension direction being perpendicular to each other, the position-limiting assembly being configured to engage with the mounting frame so as to move in the first extension direction, and the position-limiting assembly being further configured to engage with the position-limiting frame so as to move in the second extension direction.

8. The device according to claim 7, wherein each of the position-limiting frame and the support is connected in a central position thereof to the other.

9. The device according to claim 1, wherein the filter cleaning assembly is configured to traverse a region to be cleaned, and the region to be cleaned comprises at least one intermediate portion and two curved portions respectively connected to two sides of the intermediate portion.

10. A cleaning device of an air filter of a medical imaging system, comprising:
a linkage assembly, comprising a first crank, a second crank, and a mounting frame, the first crank and the second crank having respective extension shafts parallel to each other, the first crank, the second crank, and the mounting frame each comprising a first end and a second end, wherein the first end and the second end of the mounting frame are respectively hinge-connected to the second end of the first crank and the second end of the second crank;
a filter cleaning assembly, mounted on the mounting frame; and
a driving assembly, connected to at least one of the first crank and the second crank, the driving assembly being configured to, in response to a received control signal, drive the first crank and the second crank of the linkage assembly to rotate about the respective first ends thereof, and drive the filter cleaning assembly to move relative to the air filter to clean the air filter, a motion path of each point of each extension shaft forming at least a portion of a circle or at least a portion of a plurality of repeating circles, and each extension shaft extending in a first extension direction at any time in the motion.

11. The device according to claim 10, further comprising a support, the respective first ends of the first crank and the second crank being respectively hinge-connected to a first end and a second end of the support, and wherein either the support is fixed relative to a housing of the medical imaging system or the support comprising a portion of the housing.

12. The device according to claim 11, wherein the respective first ends of the first crank and the second crank are respectively hinge-connected to the first end and the second end of the support by means of a first connecting shaft and a second connecting shaft, and the driving assembly comprises a motor and a drive shaft, wherein a first end of the drive shaft being used to be connected to at least one of the first connecting shaft and the second connecting shaft, the motor being connected to a second end of the drive shaft, and the motor being configured to, in response to the control signal, drive the drive shaft to rotate, and drive at least one of the first connecting shaft and the second connecting shaft to rotate, so as to drive the first crank and the second crank to rotate about the respective first ends thereof.

13. The device according to claim 12, wherein the driving assembly further comprises a gear drive assembly connected between the drive shaft and the first connecting shaft, and the gear drive assembly is configured to change the direction of rotational force of the drive shaft, and then transmit the same to the first connecting shaft.

14. The device according to claim 10, wherein a first elastic component is provided between the mounting frame and the first crank, and a second elastic component is provided between the mounting frame and the second crank.

15. The device according to claim 11, wherein the support is configured to extend in a first extension direction, and the cleaning device further comprises a position-limiting frame and a position-limiting assembly, the position-limiting frame being configured to extend in a second extension direction, the first extension direction and the second extension direction being perpendicular to each other, the position-limiting assembly being configured to engage with the mounting frame so as to move in the first extension direction, and the position-limiting assembly being further configured to engage with the position-limiting frame so as to move in the second extension direction.

16. A medical imaging system, comprising:
a housing, having at least one air inlet and at least one air outlet;
at least one air filter provided at the at least one air inlet; and
at least one cleaning device mounted on the housing, wherein the at least one cleaning device comprises:
a linkage assembly;
a filter cleaning assembly, mounted on the linkage assembly; and
a driving assembly, connected to the linkage assembly and configured to, in response to a received control signal, drive the linkage assembly to move so as to drive the filter cleaning assembly to move relative to the air filter to clean the air filter, a motion path of each point on an extension shaft of the filter cleaning assembly forming at least a portion of a circle or at least a portion of a plurality of repeating circles, and the extension shaft extending in a first extension direction at any time in the motion,
wherein the linkage assembly comprises a first crank, a second crank, a support, and a mounting frame, the first crank, the support, the second crank, and the mounting frame being sequentially hinge-connected, central axes of the first crank, the support, the second crank, and the mounting frame defining a parallelogram, the filter cleaning assembly being mounted on the mounting frame, and the driving assembly being connected to at least one of the first crank and the second crank, so as to drive the first crank and the second crank to rotate about respective first ends thereof, and to drive the mounting frame and the filter assembly thereon to move.

17. The system according to claim 16, wherein the medical imaging system is an ultrasonic system.

* * * * *